INVENTORS
SAM A. JONES AND
JOSEPH P. ECHTLER, JR.
BY
*Harry B. Keck*
ATTORNEY

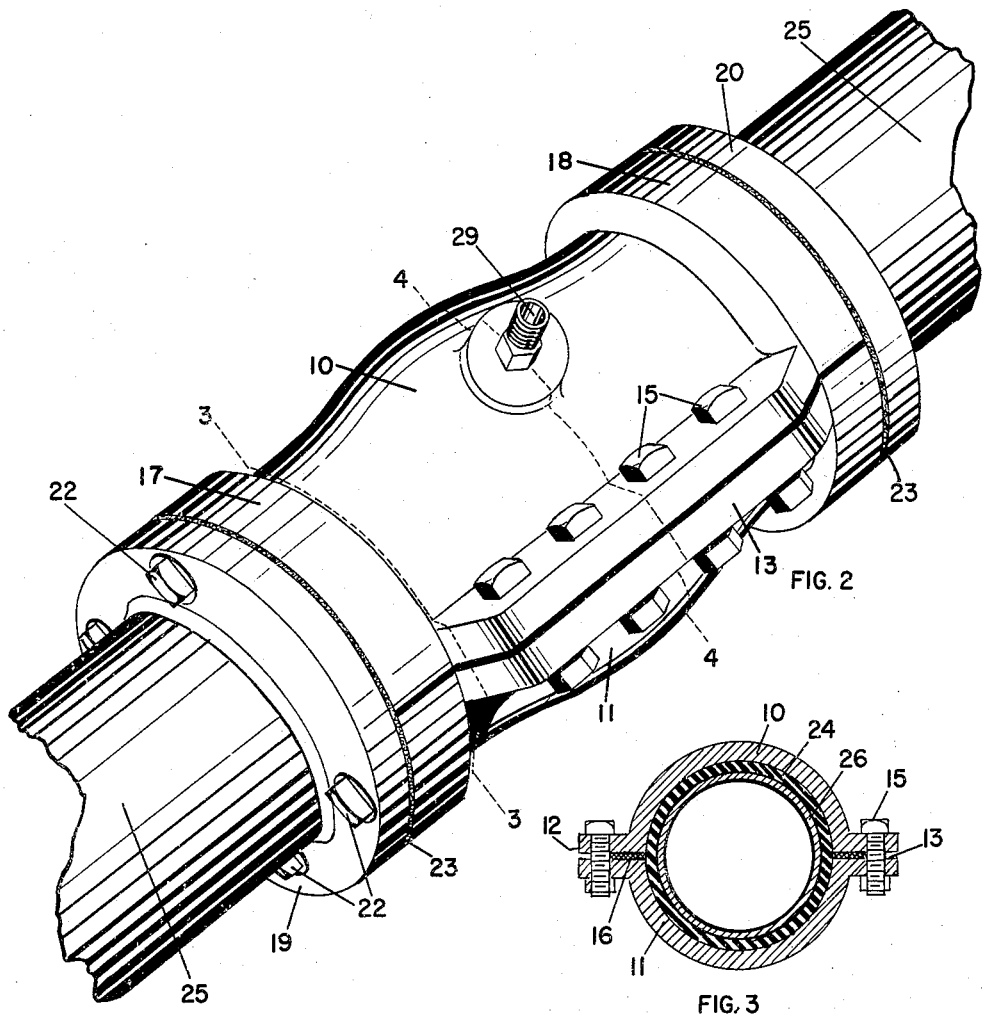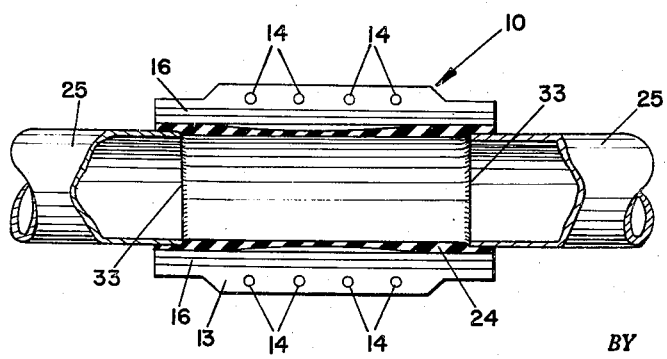

Feb. 21, 1961 S. A. JONES ET AL 2,972,464
FLEXIBLE CONDUIT VALVE

Filed Sept. 30, 1957 4 Sheets–Sheet 3

*INVENTORS*
SAM A. JONES AND
JOSEPH P. ECHTLER, JR.
BY
*Harry B. Keck*
ATTORNEY

Feb. 21, 1961 S. A. JONES ET AL 2,972,464
FLEXIBLE CONDUIT VALVE
Filed Sept. 30, 1957 4 Sheets-Sheet 4

*INVENTORS*
SAM A. JONES AND
BY JOSEPH P. ECHTLER, JR.

Harry B. Keck
ATTORNEY

United States Patent Office 2,972,464
Patented Feb. 21, 1961

2,972,464
FLEXIBLE CONDUIT VALVE

Sam A. Jones, Pittsburgh, Pa. (11 Lake Hollingsworth Drive, Lakeland, Fla.), and Joseph Paul Echtler, Jr., 30 Ruthfred Drive, Bridgeville, Pa.

Filed Sept. 30, 1957, Ser. No. 687,125

7 Claims. (Cl. 251—5)

The present invention relates to flexible conduit valves, and more particularly, to hydraulically or pneumatically operated flexible conduit valves.

This application is a continuation-in-part of our copending application S.N. 454,544 filed September 7, 1954, entitled "Flexible Conduit Valve" and since abandoned.

Flexible conduit valves have long been employed to control the flow of fluids having corrosive and/or erosive properties. Such valves usually comprise a deformable section of conduit inserted in series with the pipe carrying the fluid whose flow is to be controlled. The deformable conduit can be partially compressed for throttling the flow and wholly compressed for shutting off the flow of fluid. Usually the compression of the deformable conduit is obtained through mechanical apparatus which pinches its walls together. Valves of the mechanically pinched variety are objectionable because of the required moving parts in the mechanical pinching apparatus and because the abrasion of the flexible conduit is concentrated at the area of the mechanical pinching. Frequent replacement of these mechanically pinched flexible conduits is required. Moreover the mechanically pinched valves are not adapted for use in high pressure fluid flowing systems.

Flexible conduit valves also have been proposed in which the flexible conduit is encased in a pressure tight housing forming an annular space around the flexible conduit. These valves are operated by admitting hydraulic or pneumatic fluid into the annular space between the pressure tight housing and the flexible conduit to cause flexure and partial or total closing of the flexible conduit. Flexible conduit valves of this type have been provided with complex sealing devices, usually requiring flexible conduits which are expensive to fabricate and difficult to install or replace. Such valves experience stress concentrations at the seals resulting in early failure of the flexible conduit.

In the present invention we have provided a flexible conduit valve, operated pneumatically or hydraulically, which eliminates the deficiencies of similar previously proposed valves and is well suited to high pressure service. The present valve employs a flexible conduit mounted in a split valve housing; is readily and inexpensively fabricated; requires no external support; can be readily dismantled for installation or replacement; experiences no undue stress concentrations on flexure; can be installed and operated in high pressure fluid flowing systems; is easily controllable for flow throttling or stopping services from remote control points; and prevents escape of the flowing fluid in the event of a rupture in the valve sleeve.

For a better understanding of the present invention, its objects and advantages, reference should be had to the following description and the accompanying drawings in which:

Figure 2 is a perspective illustration of the assembled valve shown in Figure 1;

Figure 3 is a cross-section drawing of the assembled valve along section 3—3 of Figure 2;

Figure 9 is a cross-section illustration, similar to Figure 5, showing an alternative embodiment of this invention.

Figure 1:
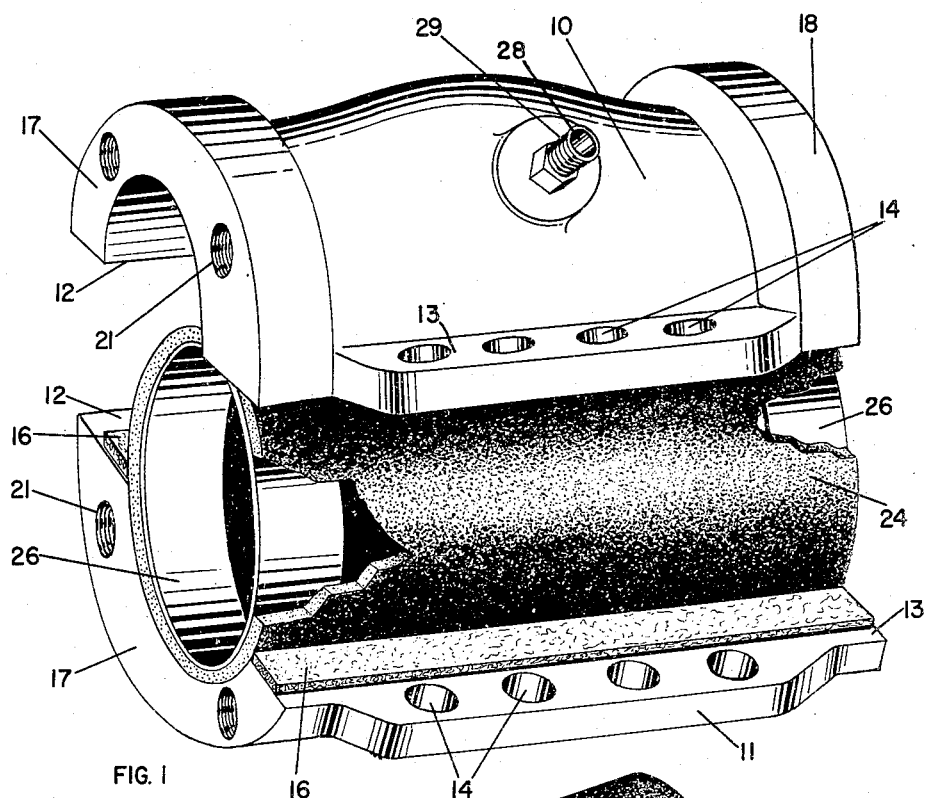
Figure 1 is an exploded, perspective drawing of the preferred embodiment of this invention.

As shown in Figures 1 and 2, the valve casing comprises two semi-cylindrical shells 10 and 11 which at each end are semi-circular in cross-section and have at the center an outwardly extending bulge which results in an approximately parabolic cross-section of the casing shells at the center.

The sides of the casing shells 10 and 11 are provided with flat, outwardly extending flanges 12 and 13 which have flat, coplanar gasket engaging surfaces. When the flanges 12 and 13 are joined and aligned, the casing shells 10 and 11 form a hollow valve casing, cylindrical in cross-section at each end, and oval-shaped in cross-section at the center. Flange bolt holes 14 are provided through each of the flanges 12 and 13 to receive flange bolts 15 for securing alignment of the valve casing shells 10 and 11. The flange bolt holes 14 are displaced from the inner surface of the valve casing cylinder to permit installation of a flat, strip gasket 16 between the inner surface of the flanges 12 and 13 and the flange bolt holes 14. The flat, strip gasket 16 is colinear at its inner edge with the parallel inner sides of the flanges 12 and 13. By tightening the flange bolts 15, compression of the gasket 16 secures a fluid tight seal between the inner and outer surfaces of the assembled valve casing.

Each of the valve casing shells 10 and 11 has at each end semi-circular, radially projecting, coupling flanges 17 and 18. When the valve casing shells are assembled, these semi-circular flange ends form a circular flange which corresponds to a standard pipe flange 19 and 20. Flange bolt holes 21 are drilled and tapped into the semi-circular flanges 17 and 18 to receive flange bolts 22 from standard pipe flanges 19 and 20. A circular flange gasket 23 is provided to seal the flange joint between the flanges 17 and 19, 18 and 20. The strip gasket 16 should terminate colinearly at its ends with the intersection of the flat surfaces of the flanged ends 17 and 18.

A flexible cylindrical sleeve 24, having an inner diameter or bore substantially equal to that of the pipe 25 in which the valve is to be used, is adapted at each end to receive a cylindrical metal pipe insert 26, also having an inner diameter substantially equal to that of the pipe 25. The sleeve 24 preferably is made of rubber or some similar strong, elastic material. Multi-ply rubberized fabric is well suited. The metal pipe inserts 26, which may be bonded to the flexible sleeve 24 at the enlarged ends if desired, should terminate at the extremity of the sleeve 24.

The ends of the sleeve 24, fitted with metal pipe inserts, are slightly larger in outer diameter than the inner diameter of the circular opening at the ends of the assembled valve casing. Accordingly, assembly of the casing shells 10 and 11 with the sleeve 24 between them requires compression of the resilient sleeve 24 between the circular ends of the casing shells and the metal pipe insert 26 throughout the entire periphery of the end of the sleeve 24. The relationship of the parts of the assembled valve at its end is shown in Figure 3 which is a cross-sectional diagram taken along the section 3—3. The valve sleeve 24 in the assembled valve is under compression between the metal pipe insert 26 and the valve casing sections 10 and 11. The compression of the ends of the sleeve 24 provides a fluid tight seal between the inner and outer surfaces of the assembled valve casing; provides the necessary clamping of the valve sleeve 24 itself; and secures the seal between the gasket 16 and the compressed sleeve 24.

Figure 4:
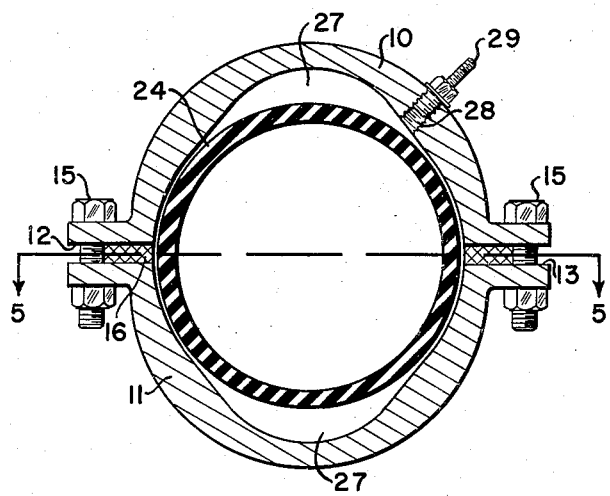
Figure 4 is a cross-section drawing of the assembled valve open to the flow of fluids therethrough taken along section 4—4 of Figure 2.

As shown in Figure 4, the outwardly extending bulge at the central portion of the casing shells 10 and 11 forms a cavity 27 between the elastic sleeve 24 and the assembled valve casing. In the central portion of the valve, the elastic sleeve 24 does not contact the inner walls of the housing. Thus the cavities 27 are in open communication with each other to form an annular operating chamber. The cavities 27 must provide sufficient expansion space to receive the elastic sleeve 24 when it is totally flattened on closure of the valve.

Figure 5:
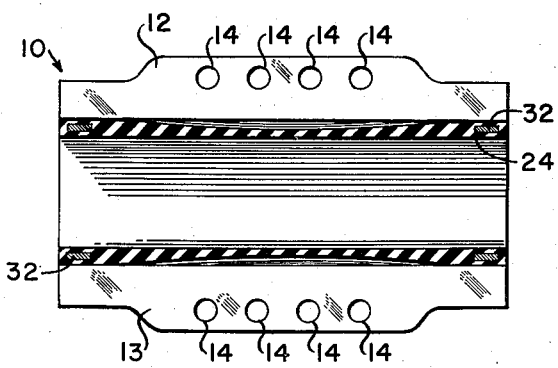
Figure 5 is a cross-section illustration of an assembled valve taken along the line 5—5 of Figure 4.

In Figure 5, the space between the outer surface of the elastic sleeve 24 and the inner surface of the casing shells 10 adjacent to the flange surfaces 12 and 13 can be seen. This opening is sufficient to permit communication of valve-operating fluids between the two cavities 27, but does not allow the elastic sleeve 24 to be distorted outwardly against casing shells adjacent to the flange surfaces 12 and 13. Hence distortion of the elastic valve sleeve 24, on closure of the valve, occurs outwardly into the cavities 27.

An aperture 28 is provided through the wall of the valve casing section 10 at its expanded central portion to permit introduction of operating fluid, hydraulic or pneumatic, into the communicating cavities 27 to collapse the elastic sleeve 24 and close the valve. Suitable connecting means such as a threaded pipe member 29 are provided to join the cavity 27 of the valve casing section 10 through the aperture 28 to a source of pressurized operating fluid.

Under normal operating conditions, sufficient hydraulic or pneumatic pressure is maintained in the cavity 27 to offset the pressure of the fluid flowing in the pipe 25. Thus there is no excessive pressure differential across the sleeve 24, even when the valve is installed in a high fluid pressure conduit and the sleeve 24 accordingly retains its circular cross-section. By increasing the pressure within the cavities 27 above that of the fluid flowing in the conduit, the sleeve is caused to flex and distort initially into a generally oval shape as the outwardly applied pressure tends to flatten the sleeve 24 along its diameter. Since the elastic sleeve 24 is separated from but closely confined by the inner surface of the casing shells 10 and 11 along this juncture, the major axis of the oval-shaped distorted sleeve appears in each of the cavities 27 where the sleeve is not so confined. The minor axis of the oval-shaped distorted sleeve appears along the plane of the juncture between the casing shells 10 and 11. In the oval-shaped position, the cross-sectional area of the sleeve is reduced whereby a throttling of fluid flow through the valve is effected.

Control of the pressure differential across the sleeve 24 can produce accurate throttling of the valve. Remote control of the valve operation can be obtained through the use of hydraulic or pneumatic lines supplying the operating fluid from the remote control site.

Figure 6:
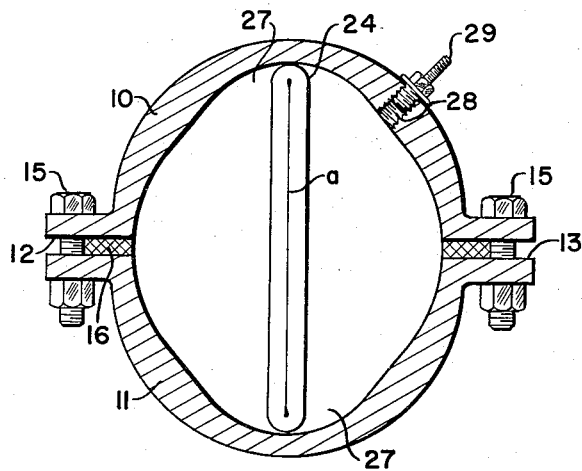

Application of greater operating fluid pressure within the cavities 27 results in total sealing of the sleeve 24 and stoppage of the fluid flow through the valve. Total sealing of the valve occurs as shown in Figure 6 when the sleeve 24 is flattened across its diameter with the central portion of its inner walls in surface-to-surface contact. In its totally closed position, the ends of the flattened sleeve 24 extend each into one of the opposed cavities 27 and the center of the flattened sleeve is withdrawn inwardly from the inner surfaces of the casing shells 10 and 11 in the area of their juncture.

Figure 7:
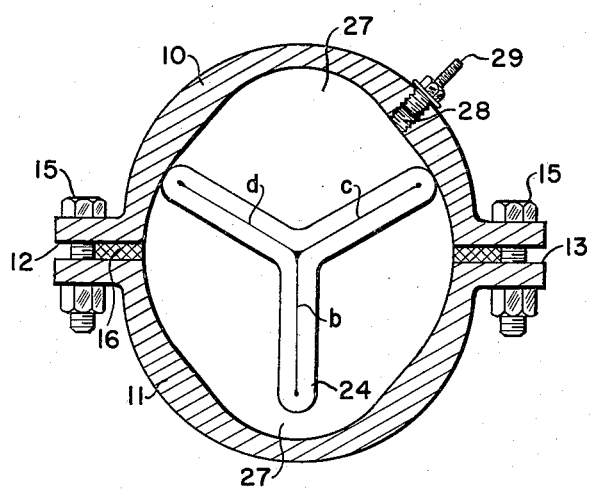
Figures 6 and 7 are cross-section illustrations of an assembled valve closed to the flow of fluids therethrough taken along the line 4—4 of Figure 2.

Valve sleeve closure of the type illustrated in Figure 6 occurs, we have found, for valves having sleeves up to about 3-inches inner diameter, i.e., flattening of the elastic sleeve 24 along a single surface *a*. For valves of larger inner diameter than about 3-inches, the closure may occur in the manner illustrated in Figure 7, i.e., along three surfaces *b, c, d*. The three surfaces *b, c, d* have substantially equal length, thereby providing nearly equal stresses throughout the elastic sleeve 24.

The flanges 17 and 18, shown as circular in the drawings, could have any geometric shape if desired to facilitate supporting mounting for the valve. The circular locus of flange bolt holes should be retained to conform with the standard pipe flanges 19 and 20 of the pipeline 25.

Figure 8:
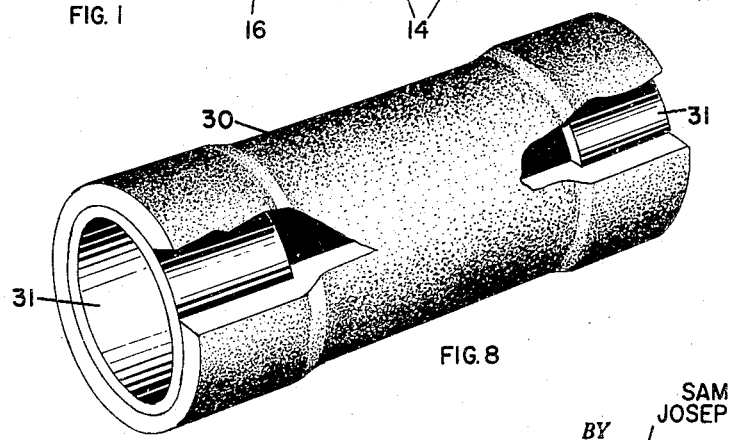
Figure 8 is a perspective drawing having cut out sections of an alternative sleeve for use in the present invention.

An alternative construction of the valve sleeve is illustrated in Figure 8 where the numeral 30 indicates the elastic sleeve generally, and the numeral 31 indicates the cylindrical metal band inserts. The inner diameter of the metal band inserts 31 is the same as the inner diameter of the sleeve 30. At each end of the sleeve 30, a right-angled recess is provided to receive the metal band inserts 31, and the outer diameter of the sleeve 30 is increased at each end to provide the thickness required to obtain the desired compression of the sleeve ends upon assembly of the valve casing. The inner diameter of the sleeve 30 at its central portion provides clearance to assure communication of valve operating fluid through the two cavities of the valve casing shells.

The right-angled recess shown at each end of the sleeve 30 distinguishes the construction of Figure 8 from that of Figure 1, wherein the sleeve 24 has a uniform diameter, and from that of Figure 5, wherein the sleeve 24 has rigid bands 32 embedded in the ends thereof.

A further alternative construction of the valve sleeve is illustrated in Figure 5 where metal band inserts 32 are embedded into the ends of the valve sleeve 24 during its fabrication. Valve sleeves having embedded metal band inserts are particularly desirable where the valve is used to control flow of corrosive fluids such as acids. One preferred method for constructing the valve sleeves is to wrap fabric around a mandrel corresponding to the desired sleeve inner diameter and to intersperse the fabric plies with rubber or other curable elastic material. Where embedded metal band inserts are provided, these fabric plies preferably are wrapped around the inserts. Thereby the metal band inserts are more firmly secured into the elastic sleeve. In this embodiment, a sufficient thickness of compressible elastic material should be provided around the metal band insert 32 to provide a secure seal when the sleeve is assembled into the two valve casing shells and tightened by the lateral flange bolts extending through the bolt holes 14.

A valve in accordance with the present invention for a 3-inch nominal pipeline has a flexible sleeve with a length-diameter ratio of about 3/1, whereas the flexible conduits in available mechanically pinched 3-inch nominal valves usually have a length/diameter ratio of about 4/1. Moreover with our new valve, the length/diameter ratio is less for larger valves. Thus the present valve requires less installation space than any corresponding available valves.

Thickness of the valve sleeve for a 3-inch nominal pipe valve is about one-half inch. Where a one-half inch thickness sleeve of four-ply rubberized fabric has been employed as a valve sleeve in a 3-inch pipeline, accurately controllable throttling of the flow can be achieved with a pressure differential across the sleeve of 5 to 10 pounds per square inch; a pressure differential less than 50 pounds per square inch is sufficient to effect a total stoppage of flow. Sleeves having a more resilient construction material, for example a two-ply rubberized fabric sleeve, require less pressure differentials for operation. Satisfactory valves according to the present invention can be designed for pipes ranging from about 1-inch to about 24-inches in diameter.

The unique split valve shells of the present valve, in combination with the metal pipe inserts, permits the valve casing itself to provide the necessary sealing of the hydraulic or pneumatic operating fluid within the valve, permits the clamping of the valve sleeve securely in position at each end to avoid localized stress concentrations in the sleeve, permits ready assembly and disassembly, avoids the necessity of fabricating costly, contiguous, laterally projecting flanges in the sleeve, and permits inexpenisve construction, since the entire casing can be cast without requiring extensive machining operations.

The metal pipe inserts conveniently can be sections of the standard pipe 25 in which the valve is placed. Because the sleeve experiences no substantial pressure differential in normal operation, even in high pressure installations, its life is greatly prolonged over that of sleeves in the mechanically pinched, flexible conduit valves which are available.

Installation and replacement of the present valve can be carried out quite readily. The valve can be wholly assembled away from its installation site; installation requires merely the securing of the valve to the conduit 25 in which it is to be used by means of standard pipe flanges 19 and 20. The flanged connections at each end of the valve secure the valve against blow-out from excessive internal fluid pressure.

The source of operating fluid for the valve conveniently may be available compressed air or existing water supply lines where the operating pressures of the fluid flow are not excessive. A self-contained, manually operated, hydraulic piston may be employed for operating the valve. The low pressure differentials required for throttling and flow-closing services permit very rapid response of the valve to stimuli supplied by continuous automatic measuring equipment at selected control points in the fluid flowing system. Mechanically pinched valves, of course, require finite time for mechanical motion to effect valve operations.

Some savings can be effected in low pressure fluid flowing systems by eliminating the pipe flange connections and instead, inserting the pipe ends themselves as the metal inserts of the present valve as shown in Figure 9 which corresponds to the view of Figure 5. As shown in Figure 9, the collapsible sleeve 24 has a substantially uniform thickness. The ends of the pipeline 25 are designated by the numeral 33 and serve as the full mechanical equivalent of the metal band inserts 26 shown in Figures 1 and 3. In such an installation, the sleeve 24 would be slipped over the ends 33 of the pipe 25 and clamped in position by surrounding the sleeve 24 with the casing sections 10 (and 11—not shown), separated by the gasket 16. Such a system requires onsite assembly of the valve and requires securing the pipe 25 to prevent development of supporting stresses within the valve itself, but eliminates the flange connection of the valve to the pipeline. In low pressure fluid flowing systems, such an installation is feasible and recommended.

Our new valve is ideally suited for controlling the flow of corrosive and/or erosive fluids through a pipeline where the control point is remote from the valve location. Should the sleeve 24 rupture through excessive wear, the fluids are confined within the valve casing and cannot escape. The flow of fluids through the conduit 25 can be controlled directly and accurately through regulation of the pressure differential existing between the cavity 27 and the inside of the conduit 25.

And now according to the provisions of the patent statutes, we have explained the principle, preferred construction, and mode of operation of our invention and have illustrated and described what we now consider to represent its best embodiment. However, we desire to have it understood that within the scope of the appended claims, the invention may be practiced otherwise than as specifically illustrated and described.

We claim:

1. A fluid operated flexible conduit valve assembly comprising in combinaiton, a substantially cylindrical, deformable sleeve, a rigid cylindrical band inserted within said sleeve at each end thereof, two substantially semi-cylindrical casing shells which form when joined a substantially cylindrical valve casing about said sleeve, each of said casing shells having a radially extending expansion cavity for receiving said sleeve in its deformed position, a gasket between said casing shells forming an impermeable seal between said casing shells, fastening means which secure said casing shells in alignment, which compress said gasket and also compress the ends of said sleeve against said rigid bands, said expansion cavities being in communication externally of said sleeve and internally of said casing to define an enclosed operating chamber, means for introducing operating fluid through said casing into one of the said expansion cavities to collapse said sleeve, and a radially extending flange section at each end of said casing shells, engageable in an assembled casing with a standard circular pipe flange.

2. A fluid operated flexible conduit valve assembly comprising in combination, a substantially cylindrical casing having a radially extending flange at each end corresponding to and engageable with a standard circular pipe flange, said casing being formed from two corresponding, substantially semi-cylindrical casing shells, separated by a gasket extending along the straight, longitudinal inner walls at the diametrically opposed junctures of said casing shells, each of said casing shells having a radially extending expansion cavity between its ends opposite the plane formed by the sides of said casing shells, a deformable hollow cylindrical sleeve, coaxial and co-terminating with said casing, said sleeve having an outer surface engaged with the inner walls of said casing, at each end of said sleeve a rigid cylindrical band inserted in circumferential engagement with said sleeve, releasible fastening means which secure said casing shells in alignment, which compress said gasket and also compress the walls of said sleeve against said rigid bands, said expansion cavities being in communication externally of said sleeve and internally of said casing to define an enclosed annular operating chamber, and means for introducing operating fluid into one of said expansion cavities to collapse said sleeve.

3. A fluid operated conduit valve assembly comprising in combination, a substantialy cylindrical deformable sleeve of substantially uniform thickness, having an expanded bore at each end for internally receiving a pipe, two substantially semi-cylindrical casing shells which form when joined with a gasket therebetween a substantially cylindrical valve casing about said sleeve, releasable fastening means which secure said casing shells in alignment, which compress said gasket and also compress the end portions of said sleeve against the ends of said pipe inserted into said sleeve, each of said casing shells having a radially extending expansion cavity for receiving said sleeve in its deformed position, said expansion cavities being in communication externally of said sleeve and internally of said casing to define an enclosed annular operating chamber, and means for introducing operating fluid into one of the said expansion cavities to effect collapse of said sleeve.

4. A fluid operated flexible conduit valve assembly comprising in combination, a substantially cylindrical deformable sleeve, rigid cylindrical bands coaxially disposed in circumferential engaging relationship with the inside wall of the end portions of said sleeve, two substantially semi-cylindrical casing shells which form when joined with a gasket therebetween a substantially cylindrical valve housing about said sleeve, said housing having cylindrical end sections arranged in circumferential contact with the outside wall of said sleeve and being radially positioned with respect to said bands, said housing having a central section with oppositely positioned, arcuately extending cavity portions thereof in radially spaced relationship to said sleeve when said sleeve is in its normally unflexed position, said cavity portions being in communication externally of said sleeve and internally of said housing to define an enclosed operating chamber, fastening means which secure said casing shells in alignment, which compress said gasket and also hold said sleeve in fluid sealing and motion limiting relationship between said bands and the cylindrical end sections of said housing, means for introducing fluid under pressure through said housing into at least one of said cavity portions to collapse said sleeve, and means for attaching said end sections of said housing to the terminals of a pipe.

5. A fluid operated flexible sleeve valve comprising a resilient cylindrical sleeve having an inner wall and an outer wall, a rigid cylindrical element coaxial with said sleeve at each end thereof being separated from said outer wall, a casing having a longitudinal passage for receiving said sleeve substantially coterminating with said sleeve, said casing being formed from two similar shell portions each having an inner surface, an outer surface and a laterally extending flange along each longitudinal edge intersecting said inner surface in a straight line, gasketing means alignable with said laterally extending flange along said straight line, said inner surface being semi-circular in cross-section at each end and in peripheral engagement with said outer wall of said sleeve, said inner surface extending outwardly between the ends of said shell portions to form a cavity portion, said cavity portion being in communication with an opposed cavity portion externally of said sleeve and internally of said casing to define an enclosed annular operating chamber, releasable fastening means associated with said outwardly extending flanges which secure said two similar shell portions in mating relation about said sleeve with said gasketing means therebetween whereby said gasketing means is maintained at each end thereof in abutting relation with the ends of said sleeve and the end portions of said sleeve are maintained in compression throughout their periphery between the ends of said shell portions and said rigid cylindrical elements, and means for introducing operating fluid through said casing into one of the said cavity portions to collapse said sleeve.

6. A fluid operated flexible sleeve valve comprising a fluid conveying resilient cylindrical sleeve having inner walls and outer walls, a rigid cylindrical band having an inner diameter at least as large as that of said sleeve at each end of said sleeve and being separated from said outer walls, a casing having a longitudinal passage for receiving said sleeve substantially coterminating with said sleeve, said casing being formed from two similar shell portions each having an inner surface, an outer surface, a radially extending flange at each end and a laterally extending flange along each longitudinal edge intersecting said inner surface in a straight line, gasketing means aligned with said laterally extending flanges along said straight line, said inner surface being semi-circular in cross-section at each end and in peripheral engagement with said outer wall of said sleeve, said inner surface expanding outwardly between the ends of said shell portions to form a cavity between said sleeve and each of said shell portions, releasable fastening means associated with said outwardly extending flange portions which secure said two similar shell portions in mating relation about said sleeve with said gasketing means therebetween whereby said gasketing means is maintained at each end thereof in abutting relation with the ends of said sleeve and maintained in compression between said outwardly extending lateral flanges and whereby the ends of said sleeve are maintained in compression throughout their periphery between the ends of said shell portions and said rigid cylindrical bands, and means for introducing operating fluid through said casing into one of the said cavities.

7. A fluid operated flexible conduit valve assembly comprising in combination a split housing formed from two casing shells and a substantially cylindrical deformable sleeve surrounded thereby, said housing having end portions of circular cross-section which receive and engage the end portions of said sleeve, each of said casing shells having a cavity portion between the ends thereof which form a chamber surrounding said sleeve within said housing, rigid cylindrical bands inserted within said sleeve at each end thereof, fastening means which secure said casing shells in alignment and form said housing and also compress the end portions of said sleeve between said rigid cylindrical bands and said end portions of said housing, and means for introducing operating fluid into said chamber.

References Cited in the file of this patent

UNITED STATES PATENTS

| | | |
|---|---|---|
| 2,305,840 | Brown | Dec. 22, 1942 |
| 2,313,550 | Huber | Mar. 9, 1943 |
| 2,575,240 | Thompson | Nov. 13, 1951 |
| 2,674,435 | Angell | Apr. 6, 1954 |
| 2,750,959 | Von Seggern | June 19, 1956 |

FOREIGN PATENTS

| | | |
|---|---|---|
| 504,449 | Germany | of 1930 |
| 437,702 | Italy | of 1948 |
| 801,959 | Germany | of 1951 |